(12) United States Patent
Cheney et al.

(10) Patent No.: US 6,955,705 B1
(45) Date of Patent: Oct. 18, 2005

(54) METHOD AND SYSTEM FOR COMPRESSING AND DEHYDRATING WET NATURAL GAS PRODUCED FROM LOW-PRESSURE WELLS

(75) Inventors: Richard P. Cheney, Aztec, NM (US); Brad Salzman, Farmington, NM (US)

(73) Assignee: RDC Research LLC, Farmington, NM (US)

( * ) Notice: Subject to any disclaimer, the term of this patent is extended or adjusted under 35 U.S.C. 154(b) by 0 days.

(21) Appl. No.: 10/859,044

(22) Filed: Jun. 2, 2004

(51) Int. Cl.[7] .......................................... B01D 53/26
(52) U.S. Cl. .......................... 95/42; 60/902; 95/161; 95/169; 95/186; 95/187; 96/202; 96/218; 96/219; 418/201.1
(58) Field of Search ..................... 95/39–42, 161–169, 95/186–188, 245–252, 260, 263; 96/202–204, 96/218, 219, 181; 55/DIG. 17; 417/313; 60/902; 418/83, 85, 201.1

(56) References Cited

U.S. PATENT DOCUMENTS

| | | | |
|---|---|---|---|
| 2,225,959 A | 12/1940 | Miller | 95/13 |
| 2,598,785 A * | 6/1952 | Groebe et al. | 95/39 |
| 2,663,669 A * | 12/1953 | Barnes | 208/340 |
| 3,182,434 A * | 5/1965 | Fryar | 95/161 |
| 3,254,473 A | 6/1966 | Fryar et al. | 95/180 |
| 3,535,057 A * | 10/1970 | Kodra | 418/1 |
| 3,824,766 A * | 7/1974 | Valentine et al. | 95/163 |
| 4,010,065 A | 3/1977 | Alleman | 159/4.04 |
| 4,070,231 A * | 1/1978 | Alleman | 159/47.1 |
| 5,084,074 A | 1/1992 | Beer et al. | 95/18 |
| 5,167,675 A | 12/1992 | Rhodes | 95/156 |
| 5,346,537 A | 9/1994 | Lowell | 95/161 |
| 5,453,114 A | 9/1995 | Ebeling | 95/166 |
| 5,490,873 A * | 2/1996 | Behrens et al. | 95/160 |
| 5,536,303 A | 7/1996 | Ebeling | 95/166 |
| 5,766,313 A | 6/1998 | Heath | 95/161 |
| 6,004,380 A | 12/1999 | Landreau et al. | 95/174 |
| 6,128,919 A | 10/2000 | Daus et al. | 62/624 |
| 6,216,474 B1 | 4/2001 | Sishtla | 62/84 |
| 6,217,304 B1 | 4/2001 | Shaw | 418/100 |
| 6,238,461 B1 | 5/2001 | Heath | 95/161 |
| 6,299,671 B1 * | 10/2001 | Christensen | 95/166 |
| 6,301,898 B1 | 10/2001 | Choroszylow et al. | 60/734 |
| 6,364,933 B1 | 4/2002 | Heath | 95/24 |
| 6,461,413 B1 * | 10/2002 | Landreau et al. | 95/161 |

(Continued)

FOREIGN PATENT DOCUMENTS

JP           2-153285     *  6/1990  ............. 418/201.1

OTHER PUBLICATIONS

"Screw Compressors: A Comparison of Applications and Features to Conventional Types of Machines," 2000, J. Trent Bruce, Toromont Process Systems, Calgary, Alberta, Canada.

Primary Examiner—Richard L. Chiesa
(74) Attorney, Agent, or Firm—Domingue & Waddell, PLC

(57) ABSTRACT

Method and system for compressing and dehydrating wet natural gas produced from a low-pressure well using a rotary screw compressor. A dehydrating agent is combined with wet natural gas within a rotary screw compressor. Operation of the rotary screw compressor causes compression and dehydration of the wet natural gas to produce a compressed dry natural gas. Engine exhaust produced by the engine which powers the rotary screw compressor may be used to remove water absorbed by the dehydrating agent and thereby recover the dehydrating agent for re-circulation in the system.

17 Claims, 4 Drawing Sheets

U.S. PATENT DOCUMENTS

| | | | |
|---|---|---|---|
| 6,506,039 B1 | 1/2003 | Osumimoto et al. | 418/201.1 |
| 6,551,379 B2 * | 4/2003 | Heath | 95/24 |
| 6,688,857 B1 | 2/2004 | Choroszylow et al. | 417/313 |
| 6,767,388 B2 * | 7/2004 | Lecomte et al. | 95/161 |
| 6,843,836 B2 * | 1/2005 | Kitchener | 96/234 |
| 2002/0073843 A1 * | 6/2002 | Heath | 95/14 |

* cited by examiner

METHOD AND SYSTEM FOR COMPRESSING AND DEHYDRATING WET NATURAL GAS PRODUCED FROM LOW-PRESSURE WELLS

FIELD OF THE INVENTION

The present invention relates to methods and systems for compressing and dehydrating wet natural gas produced from low-pressure wells, and more particularly, to methods and systems for compressing and dehydrating wet natural gas produced from low-pressure wells using rotary screw compression technology.

BACKGROUND OF THE INVENTION

Declining pressures in natural gas fields has resulted in the use of rotary screw compressors as wellhead boosters. Rotary screw compressors are designed for low pressure applications with inlet pressures up to 100 psig and discharge pressures up to 350 psig.

Rotary screw compressors are described in U.S. Pat. Nos. 6,506,039, 6,217,304, and 6,216,474, the disclosures of which are incorporated herein by reference. The main components include one set of male and female helically grooved rotors, a set of axial and radial bearings, and a slide valve, which are all encased in a common housing. As the rotors begin to un-mesh, the male rotor lobe will roll out of the female rotor flute. The volume vacated by the male rotor will fill with suction gas. The further un-meshing of the rotors results in an increase in the volume of gas filling the flute of each rotor.

Gas will continue to enter each flute until the rotor lobes roll out of mesh with each other. As they finish un-meshing, the flutes pass by the edge of the suction port which closes them off from the system. This is the point where the maximum volume of each flute occurs and represents the suction volume of the flute. The suction volume is the volume of trapped gas within the flute at the end of the suction process. The displacement of the rotary screw compressor can be determined by multiplying the volume of the input gas in the male and female flute by the number of lobes on the male rotor and then multiplying this figure by the rotor rpm.

The compression process begins once the suction process is over and the input volume established. The rotors continue to rotate and begin to mesh together along the bottom. The male rotor lobe moves into the female flute and reduces the volume in the flute. The compression process will continue until the compressed gas is discharged through the discharge port.

In an individual flute containing trapped gas, there are two lobe tips: one on the discharge side of the flute and one on the backside of the flute. The tip on the discharge side is referred to as the leading tip. The leading tip will be the first one to reach the discharge port. The second tip is called the trailing tip. As the leading tip of the rotor passes by the edge of the discharge port, the compression process is over and the gas will be forced into the discharge line. The discharge volume is the volume of trapped gas in the flute right before the leading tip of the rotor passes the discharge port. The discharge process continues until the male rotor lobe has completely rolled into the female flute, which displaces all of the gas and any lube oil remaining in the threads (lube oil may be injected into the rotary screw compressor to lubricate parts).

Rotary screw compressors typically have two discharge ports: an axial port and a radial port. The radial port is a V-shaped cut in the slide valve and the axial port is a butterfly shaped port machined in the end casing of the compressor between the bearing bores. Certain rotary screw compressors are designed to operate with lubrication. Those designed for lubrication require the addition of lube oil to provide sealing between rotor lobes and the casing and the male and female lobes where compression occurs. Lube oil is also required for lubrication of the bearings and shaft seals and to reduce the heat of compression in the compressor.

The lube oil system on a rotary screw compressor is a closed loop system. The oil is injected in several locations with the main oil injection port feeding the rotors directly and with smaller lines feeding other points for seals and bearings. Injected oil will drain to the rotors where it combines with the gas. The gas and oil mixture is discharged from the compressor. The gas and oil are separated from each other downstream.

A typical rotary screw compressor system is described in "Screw Compressors: A Comparison of Applications and Features to Conventional Types of Machines," J. Trent Bruce, Toromont Process Systems, Calgary, Alberta, Canada, and is depicted in FIG. 1, which illustrates a prior art flow diagram for natural gas screw compressor system 10.

As shown in FIG. 1, inlet line 11 feeds wet natural gas (gas containing water vapor) and other free liquid and solid contaminants to suction scrubber 12. Suction scrubber 12 removes the free liquid and solid contaminants from the wet natural gas. The contaminants are removed from suction scrubber 12 through drain/dump line 13 and thereafter disposed.

The wet natural gas is taken off the top of suction scrubber 12 and fed through line 14 to rotary screw compressor 15 where it mixes with the lubricating oil that is injected into rotary screw compressor 15 as described below. The lubricating oil is typically a synthetic product. Rotary screw compressor 15 compresses the wet natural gas. The compressed wet natural gas and lubricating oil mixture is discharged from rotary screw compressor 15 through line 16 to gas/oil separator 17.

Separator 17 separates the lubricating oil from the compressed wet natural gas. Typical oil carry over rates from separator 17 are in the 10 ppm range. The lubricating oil accumulates in the bottom of separator 17. The compressed wet natural gas (free of the lubricating oil) is discharged from separator 17 and is fed through line 18 to air cooler 19. In air cooler 19, the compressed wet natural gas is cooled from normal discharge temperatures of 170–200° F. down to about 100° F. The cooled compressed wet natural gas is then fed from air cooler 19 through line 20 off skid for connection to the field piping and further processing. Such further processing may include removal of the water vapor entrained within the compressed natural gas by conventional dehydrating processes which are described below. Other contaminants may also need to be removed from the compressed natural gas, as for example, $CO_2$ and/or $H_2S$ contaminants. The compressed natural gas may also have to undergo sweetening processing.

The lubricating oil accumulated in the bottom of separator 17 is fed from separator 17 through line 21 to oil cooler 22. Oil cooler 22 cools the lubricating oil from a discharge temperature down to 140–160° F. To cool the lubricating oil, a conventional antifreeze composition (e.g., a water/glycol mixture) is pumped into one side of oil cooler 22 within line 27 and acts as a heat exchanger drawing out the heat in the lubricating oil. The antifreeze composition exits oil cooler 22 at line 28 where it is fed to pump 29. Pump 29 pumps the antifreeze composition through line 30 and into air cooler 19 which cools the antifreeze composition before sending it back through line 27 and into oil cooler 22.

The cooled lubricating oil is fed from oil cooler 22 through line 23 to rotary screw compressor 15 where it is injected into the rotors and reused as a lubricant. Line 24 diverts some of the cooled lubricating oil to oil filter 25 which filters the oil down to about 10 microns. The filtered oil is fed from oil filter 25 through line 26 to rotary screw compressor 15 where it is injected into the bearings and shaft seals and reused as a lubricant.

The compressed wet natural gas obtained after undergoing rotary screw compression still contains water vapor dispersed therein. This is likely because natural gas produced from low-pressure wells normally has large amounts of saturated water vapor entrained therein. The presence of water vapor in natural gas is problematic. Water vapor may cause corrosion, clogging, and other water related damage in the equipment storing or transporting the gas. Industry practice has been to remove the water vapor from the natural gas to prevent such problems.

The most common process for removing water vapor from natural gas is glycol dehydration. The process of glycol dehydration is described in U.S. Pat. Nos. 5,453,114, 6,004,380, 5,536,303, 5,167,675, 4,010,065, 5,766,313, and 6,238,461, the disclosures of which are incorporated herein by reference.

A conventional prior art glycol dehydration system 31 is illustrated in FIG. 2. The system includes absorption column 32 in which a wet gas stream is supplied via line 33 to absorption column 32 and passes upwardly through absorption column 32 and out of absorption column 32 via dried gas line 34. A dry glycol stream (lean absorbent) is fed to the upper portion of absorption column 32 via line 35 with a wet glycol stream (water and light aromatic hydrocarbon laden absorbent stream) being recovered from the lower portion of absorption column 32 and fed via line 36 to regenerator 37. A fuel gas stream is passed to regenerator 37 via line 40 and combusted in an amount sufficient to dry the wet glycol from line 36 to produce a lean absorbent stream which is fed through line 38 to pump 39 which pumps the lean absorbent stream to absorption column 32 via line 35. The fuel gas in line 40 is fed through control valve 41 which is regulated by a thermocouple (not shown) in operative contact, as demonstrated by line 42, with regenerator 37. Pump 39 is a gas-driven pump and is driven by the flow of fuel gas in line 40.

In regenerator 37 the water and light aromatic hydrocarbon containing solvent is dried. The water and light aromatic hydrocarbon vapors which were absorbed by the glycol are discharged to the atmosphere through vent line 44. The flue gas is discharged from regenerator 37 through line 42. The dried glycol is fed from regenerator 37 through line 38 to pump 39 and then back to absorption column 34 via line 35. Although not shown, the dried glycol stream exiting regenerator 37 may be passed through a cooler to cool the glycol stream before it is delivered to pump 39.

U.S. Pat. No. 6,688,857 describes a system for compressing natural gas that is used to fire a micro-turbine to produce electricity. The system uses a rotary positive displacement compressor to compress natural gas. A lubricating fluid, e.g., glycol or a glycol/water mixture, is fed to the compressor to effect lubrication. A separator separates the natural gas from the glycol fluid. The glycol fluid, which contains water absorbed therein, is processed in a dehydrator to remove the water. The glycol fluid may be cooled by a cooler disposed between the dehydrator and the compressor. The glycol fluid is returned to the compressor to lubricate, seal, and cool the compression process. The system differs from the present invention in that it uses a rotary displacement positive displacement compressor and not a rotary screw compressor. In addition, the system is primarily concerned with dehydrating the glycol/water lubricating fluid and not with dehydrating the natural gas. The system does not describe the operational connectivity between the engine for the compressor and a glycol pump nor the use of exhaust from the engine to provide a heating source for a reboiler.

As described above, low-pressure wells pose technical and economic problems in part due to their high-water content. As reservoir pressures continue to fall, the costs associated with dehydrating wet natural gas produced from these low-pressure make it economically unfeasible to produce natural gas. Standard dehydrating equipment has proven to be economically inefficient or unfeasible with lower pipeline and reservoir pressures. Operators are unwilling to produce natural gas from low-pressure wells because equipment costs required to produce and process the gas (e.g., dehydration) do not justify the potential return on their investment. Efforts have been made to overcome the problems associated with low-pressure wells by the use and/or development of new technologies. Despite these efforts, the need still exists to make low-pressure wells economically feasible to operate by reducing operational costs.

SUMMARY OF INVENTION

It is an object of the present invention to create greater efficiencies in low-pressure natural gas production by combining processes.

It is a further object of the present invention to create greater efficiencies in low-pressure natural gas production by eliminating certain dehydration equipment.

It is a further object of the present invention to create greater efficiencies in low-pressure natural gas production by reducing and conserving energy demand.

The objects and advantages of the present invention are achieved by providing a novel method and system for compressing and dehydrating wet natural gas produced from a low-pressure well. In the method and system of the present invention, wet natural gas and a dehydrating agent are combined within a rotary screw compressor. Operation of the rotary screw compressor causes both compression and dehydration of the wet natural gas. By combining the processes of dehydration and compression, the method and system of the present invention achieve greater economic efficiencies.

These economic efficiencies are achieved by combining the process of gas compression and the process of dehydration into one process step. In accordance with the present invention, a rotary screw compressor is combined into a compressor and processing contactor for dehydration. The rotary screw compressor performs both the process of dehydration (combining the dehydrating agent with the wet natural gas) and the process of compressing the natural gas. By combining the processes of compression and dehydration into one process step using a rotary screw compressor, the present invention eliminates standard dehydrating equipment (e.g., glycol absorber) which equipment has increasingly become economically inefficient and unfeasible as reservoir pressures decline.

The present invention makes natural gas production from low-pressure wells economically feasible because the use of standard dehydrating equipment is no longer necessary. In addition, the design and operation of the rotary screw compressor, in particular the action of the twin helical rotors, provides increased efficiencies in the dehydration of wet natural gas by vigorous mixing coupled with the high rate of contact between the dehydrating agent and the water vapor entrained within the wet natural gas.

Other economies are achieved by the method and system of the present invention. In a preferred embodiment, the engine which powers the rotary screw compressor is used to power the dehydrating agent pump. In a further preferred embodiment, the engine exhaust produced by the engine which powers the rotary screw compressor and/or the dehydrating agent pump is fed to the reboiler. The reboiler uses the engine exhaust to remove water absorbed by the dehydrating agent in order to recover the dehydrating agent for re-circulation in the system. Thus, energy is conserved and savings obtained.

The method of the present invention involves feeding wet natural gas produced from a low-pressure well to a rotary screw compressor. A dehydrating agent is also fed to the rotary screw compressor and permitted to associate with the wet natural gas within the rotary screw compressor.

The dehydrating agent is preferably a glycol and more preferably, a glycol selected from the group consisting of diethylene glycol, triethylene glycol, tetraethlyene glycol, polyethylene glycol, polypropylene glycol, 1,3-butylene glycol, and hexylene glycol, and/or any combination thereof.

The addition of a glycol dehydrating agent to the screw compressor also serves a dual purpose. The glycol will act as a lubricant or lube oil to provide sealing between rotor lobes and the casing of the rotary screw compressor and between the male and female lobes of the rotors where compression occurs. The glycol lubricant will also provide lubrication for the bearings and shaft seals of the rotary screw compressor and reduce the heat of compression.

By using the glycol dehydrating agent as a lubricant or lube oil, the present invention eliminates the need for a closed-loop lubricating system which use synthetic lubricating oils. In comparison to glycol lubricants, synthetic lubricating oils are expensive and cost prohibitive. The present invention therefore further reduces operational costs and increases the economic efficiencies and feasibility of producing natural gas from low-pressure wells and pipelines.

During operation of the rotary screw compressor, the action of the rotors causes optimal mixing and contacting of the dehydrating agent with the wet natural gas. The dehydrating agent is thus able to absorb the water vapor from the wet natural gas which results in the processing of dry natural gas. Carrying out the dehydration process through the use of the rotary screw compressor has been found by the inventors herein to be an effective method of removing water vapor from wet natural gas making low-pressure gas dehydration possible and eliminating conventional dehydrating equipment. At the same time, the dry natural gas is compressed to produce a compressed dry natural gas thereby making the process efficient.

The rotary screw compressor may be operatively connected to and powered by an engine which may be an internal combustion engine driven by natural gas, electricity, or other driver. The operation of the rotary screw compressor produces a dehydrating agent/water mixture in a liquid phase and a compressed dry natural gas (natural gas substantially free of water vapor) in a gaseous phase. The combination (the dehydrating agent/water mixture and the compressed natural gas) is fed from the rotary screw compressor to a separator.

The dehydrating agent/water mixture and compressed dry natural gas are processed in the separator. The separator separates the liquid dehydrating agent/water mixture from the gaseous compressed dry natural gas.

The compressed dry natural gas is fed from the separator to a cooler. The compressed dry natural gas is processed in the cooler. The cooler cools the compressed dry natural gas. The cooled compressed dry natural gas is then fed from the cooler to a gathering system or sales line.

While the compressed natural gas is being fed from the separator to the cooler, the dehydrating agent/water mixture is fed from the separator to a reboiler. The dehydrating agent/water mixture is processed in the reboiler. The reboiler heats the dehydrating agent/water mixture to a temperature that causes vaporization of the water from the dehydrating agent/water mixture. This recovers the dehydrating agent for reuse.

The reboiler uses an energy source to heat the dehydrating agent/water mixture that is a product of other processes used in the method and system of the present invention. Energy resources are saved and operational costs reduced.

The reboiler acts as a heat exchanger. Engine exhaust produce by the engine is provided to the reboiler. In the reboiler, the heat from the exhaust is transferred to the dehydrating agent/water mixture which causes vaporization and removal of the water. This recovers the dehydrating agent for reuse in the system. The reboiler is preferably thermostatically controlled to divert the exhaust gas from the engine to the reboiler. The exhaust gas provides a sufficient heating source to meet the reboiler's requirement for an operating temperature of 275–300° F. By using engine exhaust as a heat source to recover the dehydrating agent, the present invention saves energy costs, is made more efficient, and increases economic feasibility of the production of low-pressure natural gas reservoirs.

The recovered dehydrating agent is re-circulated to the rotary screw compressor for re-use therein to absorb and dehydrate the wet natural gas continually being produced by the low-pressure well and fed to the rotary screw compressor. The recovered dehydrating agent must be processed before it can be fed back into the rotary screw compressor.

This procedure involves feeding the recovered dehydrating agent from the reboiler to a dehydrating agent pump. The dehydrating agent pump is operatively connected to and powered by the engine which provides the power source for the rotary screw compressor. Again, this conserves energy resources, which otherwise would be required to operate the dehydrating agent pump.

The dehydrating agent pump causes the recovered dehydrating agent to be fed from the pump to the cooler and ultimately back to the rotary screw compressor. The recovered dehydrating agent is processed in the cooler. The cooler cools the recovered dehydrating agent.

After cooling the dehydrating agent is fed from the cooler to at least one dehydrating agent filter. The dehydrating agent filter acts to filter the cooled recovered dehydrating agent thus reducing the particle size thereof and removing particulate matter. The filtered cooled recovered dehydrating agent is fed from the dehydrating agent filter to the rotary screw compressor for reuse in the dehydration process.

Hydrocarbon production obtained from a wellhead of the low-pressure well may, in addition to the wet natural gas, include contaminants such as free liquids and/or solids. These free liquid and/or solid contaminants need to be separated from the wet natural gas before the wet natural gas is fed into the rotary screw compressor. Accordingly, the method of the present invention may involve the steps of feeding the hydrocarbon production to an inlet scrubber. The hydrocarbon production is processed in the inlet scrubber. The inlet scrubber separates the free liquid and/or solid contaminants from the wet natural gas.

The wet natural gas is then fed from the inlet scrubber to the rotary screw compressor where the same methods are carried out as described above to compress and dehydrate the natural gas.

The methods of the present invention may be employed in the system of the present invention for compressing and dehydrating wet natural gas produced from a low-pressure well.

The system includes a first line feeding a hydrocarbon production obtained from a wellhead of a low-pressure well to an inlet scrubber. Because the hydrocarbon production may include not only wet natural gas, but also free liquid and/or solid contaminants, the inlet scrubber is operated to separate the free liquid and/or solid contaminants in the hydrocarbon production from the wet natural gas in the hydrocarbon production.

A second line feeds the wet natural gas from the inlet scrubber to the rotary screw compressor. A third line feeds a dehydrating agent from at least one dehydrating agent filter to the rotary screw compressor. As described above, the dehydrating agent associates and/or combines with the wet natural gas within the rotary screw compressor. The dehydrating agent may be a glycol and more preferably may be a glycol selected from the group consisting of diethylene glycol, triethylene glycol, tetraethlyene glycol, polyethylene glycol, polypropylene glycol, 1,3-butylene glycol, hexylene glycol, and/or any combination thereof.

An engine is operatively connected to and powers the rotary screw compressor to compress and dehydrate the wet natural gas as described above to produce a dehydrating agent/water mixture in a liquid phase and a compressed dry natural gas in a gaseous phase.

A fourth line feeds the dehydrating agent/water mixture and the compressed dry natural gas from the rotary screw compressor to a separator. The separator separates the dehydrating agent/water mixture from the compressed dry natural gas.

A fifth line feeds the compressed dry natural gas from the separator to a cooler. The cooler cools the compressed dry natural gas. A sixth line feeds the cooled compressed dry natural gas from the cooler to a gathering system or sales line.

A seventh line feeds the dehydrating agent/water mixture from the separator to a reboiler. The reboiler heats the dehydrating agent/water mixture to a temperature that causes vaporization of the water from the dehydrating agent/water mixture which results in the recovery of the dehydrating agent.

In a preferred embodiment of the system, the engine exhaust produced by the engine which powers the rotary screw compressor and the dehydrating agent pump is fed via an engine exhaust supply line from the engine to the reboiler. The reboiler preferably uses the engine exhaust to heat the dehydrating agent/water mixture, boil off the water, and recover the lean dehydrating agent.

An eighth line feeds the recovered dehydrating agent from the reboiler to a dehydrating agent pump. Preferably, the dehydrating agent pump is operatively connected to and powered by the same engine which powers the rotary screw compressor.

The dehydrating agent pump is responsible for pumping the dehydrating agent back up to pressure after it passes through the cooler to cause the dehydrating agent to be fed through the system to the rotary screw compressor. It is preferred if the dehydrating agent pump pumps or causes the recovered dehydrating agent to be fed from the reboiler to the rotary screw compressor through the eighth, ninth, tenth, and third lines.

A ninth line feeds the recovered dehydrating agent from the dehydrating agent pump to the cooler. The cooler cools the recovered dehydrating agent.

A tenth line feeds the cooled recovered dehydrating agent from the cooler to the at least one dehydrating agent filter. The dehydrating agent filter functions to filter the cooled recovered dehydrating agent to remove particulate matter before the cooled recovered dehydrating agent is fed through the third line back to the rotary screw compressor for reuse in the system.

The objects and advantages of the present invention including those mentioned above and others will be readily apparent to one skilled in the art to which the invention pertains from a perusal of the claims and the following detailed description of preferred embodiments when read in conjunction with the appended drawings.

DESCRIPTION OF PREFERRED EMBODIMENTS OF THE INVENTION

Figure 1:
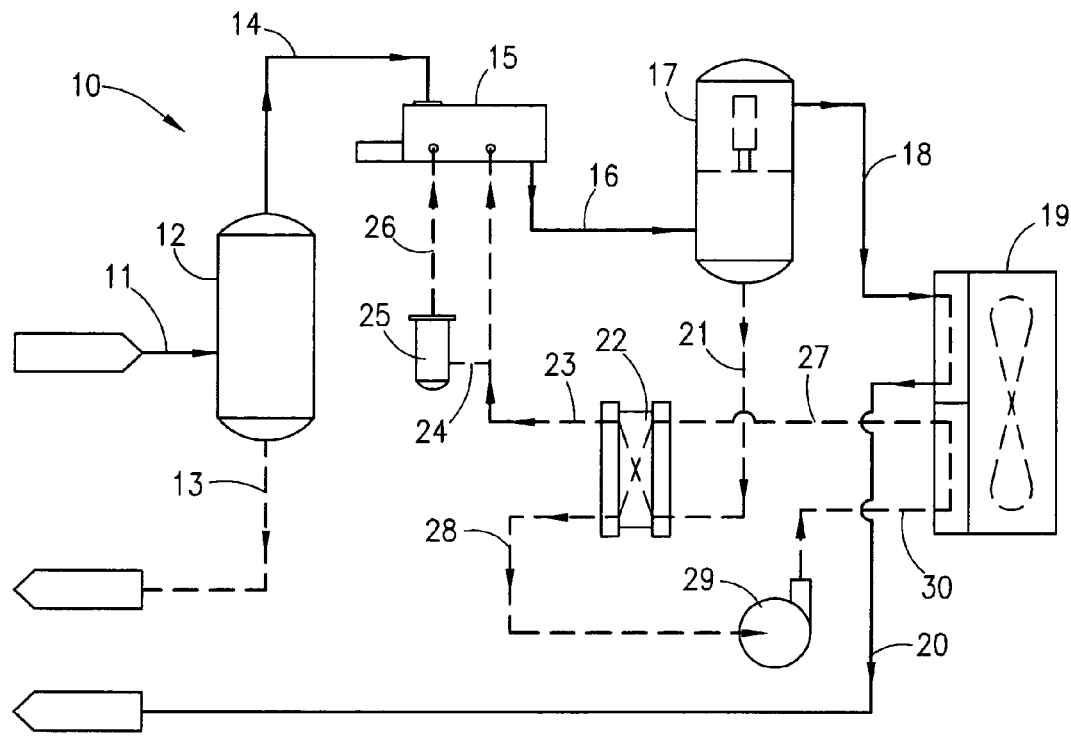
FIG. 1 is a prior art schematic illustration of a rotary compression system for natural gas.
Figure 2:
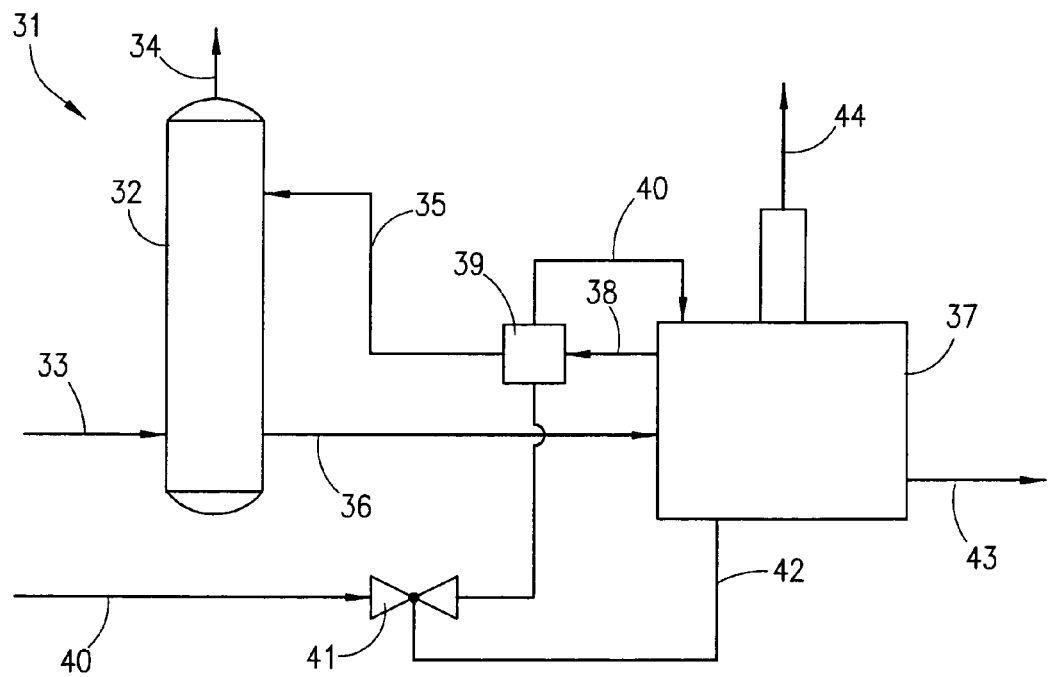
FIG. 2 is a prior art schematic illustration of a conventional dehydrating system for natural gas.
Figure 3:
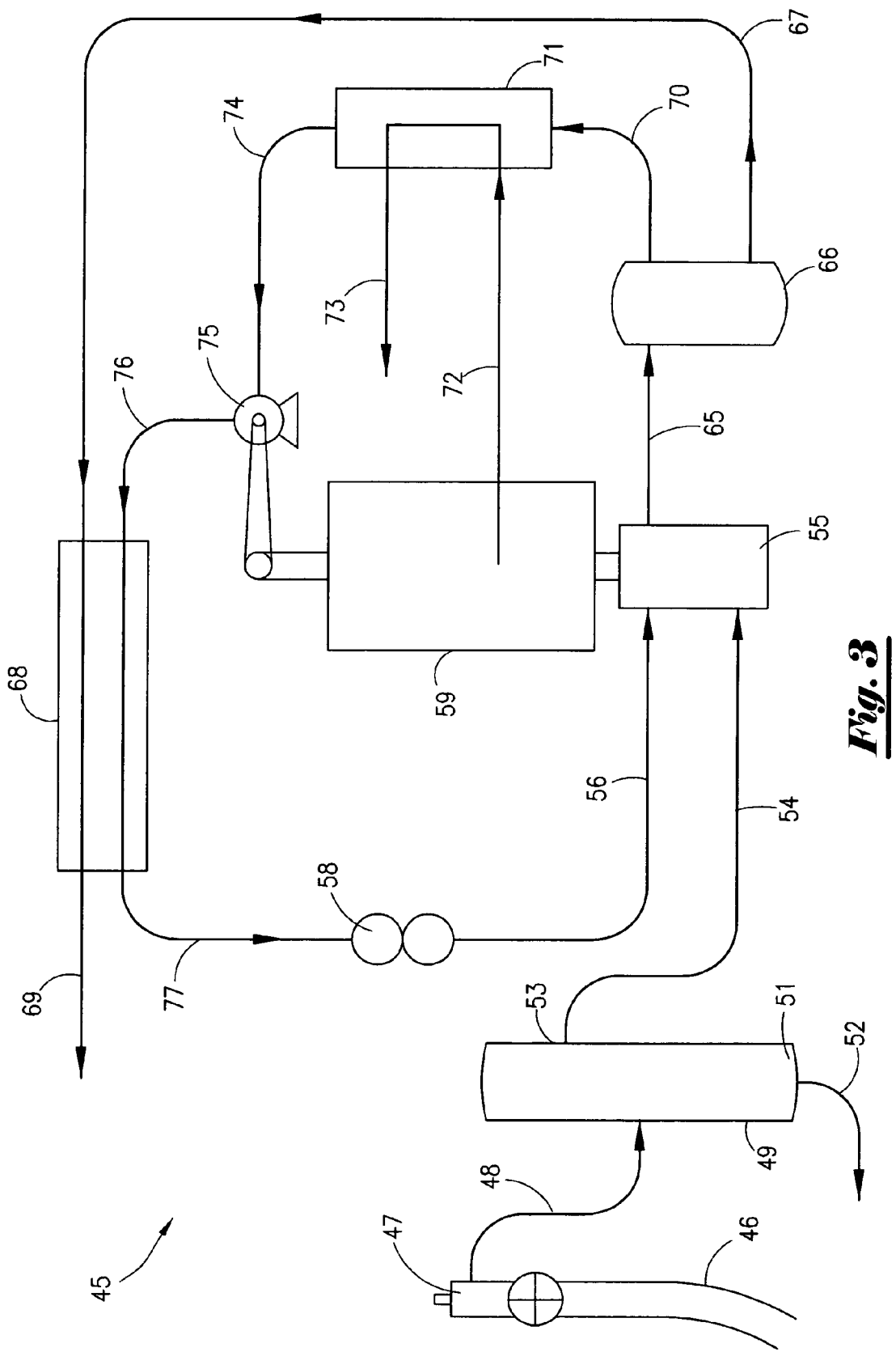
FIG. 3 is a schematic illustration of the method of the present invention for compressing and dehydrating wet natural gas.
Figure 4:
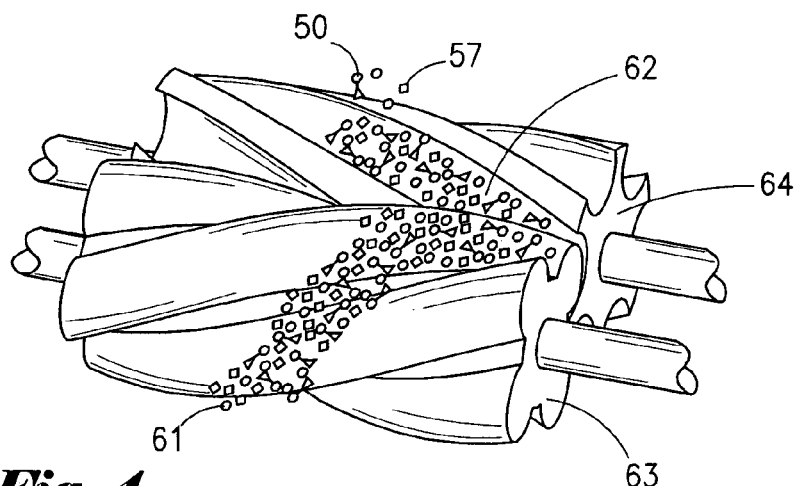
FIG. 4 is a perspective view of twin helical rotors of a rotary screw compressor in the initial stage of compressing and dehydrating wet natural gas in accordance with the method and system of the present invention.

With reference to the figures where like elements have been given like numerical designation to facilitate an understanding of the present invention, and particularly with reference to the embodiment of the compression and dehydration system 45 of the present invention illustrated in FIGS. 3–10, a hydrocarbon production produced from low-pressure well 46 is fed from wellhead 47 through line 48 to inlet scrubber 49. Inlet scrubber 49 may be a conventional scrubber apparatus for removing free liquid and solid contaminants from a natural gas stream. The hydrocarbon production is passed up through inlet scrubber 49 which separates wet natural gas 50 from any free liquid and/or solid contaminants in the hydrocarbon production. The liquid and/or solid contaminants settle at the bottom portion 51 of inlet scrubber 49 and are discharged therefrom via line 52 for disposal.

Wet natural gas 50 passes from upper portion 53 of inlet scrubber 49 through line 54 to rotary screw compressor 55. Line 56 feeds dehydrating agent 57 from dehydrating agent filter 58 to rotary screw compressor 55. Rotary screw compressor 55 may be any conventional rotary screw compressor.

It is to be understood that line 56 could be in fluid communication with line 54 so that dehydrating agent 57 is fed into line 56 where dehydrating agent 57 and wet natural gas 50 are combined. Dehydrating agent 57 and wet natural gas 50 would then be fed to rotary screw compressor 55 via line 54.

Dehydrating agent 57 associates with wet natural gas 50 within rotary screw compressor 55 and absorbs water vapor present in wet natural gas 50. Dehydrating agent 57 may be a glycol and more preferably may be a glycol selected from the group consisting of diethylene glycol, triethylene glycol, tetraethlyene glycol, polyethylene glycol, polypropylene glycol, 1,3-butylene glycol, hexylene glycol, and/or any combination thereof.

The amount of dehydrating agent 57 that is fed into rotary screw compressor 55 in order to dehydrate wet natural gas 50 depends upon the flow rate, cooling requirement, and water vapor content of wet natural gas 50.

If dehydrating agent 57 is a glycol, dehydrating agent 57 may also act as a lubricant to lube and seal the moving parts of rotary screw compressor 55 and to cool rotary screw compressor 55 during compression.

Engine 59 is operatively connected to and powers rotary screw compressor 55. Engine 59 is a conventional natural gas or electric internal combustion engine. Operation of rotary screw compressor 55 compresses and dehydrates wet natural gas 50 to produce dehydrating agent/water mixture 60 in a liquid phase and compressed dry natural gas 61 in a gaseous phase.

Figure 5:
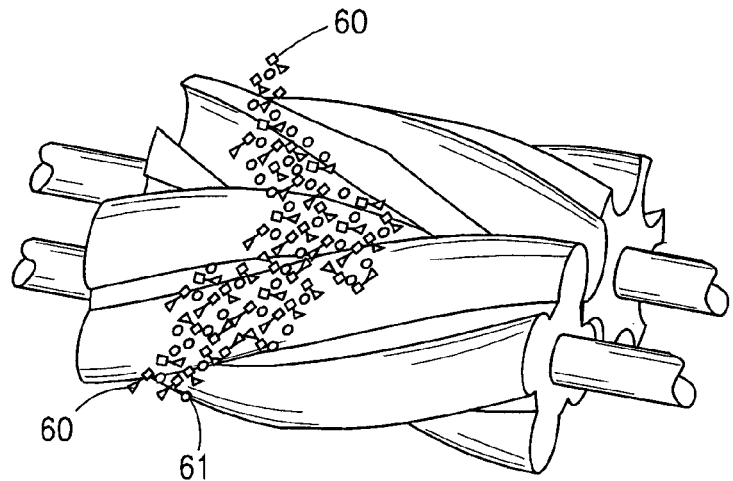
FIG. 5 is a perspective view of twin helical rotors of a rotary screw compressor in the interim stage of compressing and dehydrating wet natural gas in accordance with the method and system of the present invention.
Figure 6:
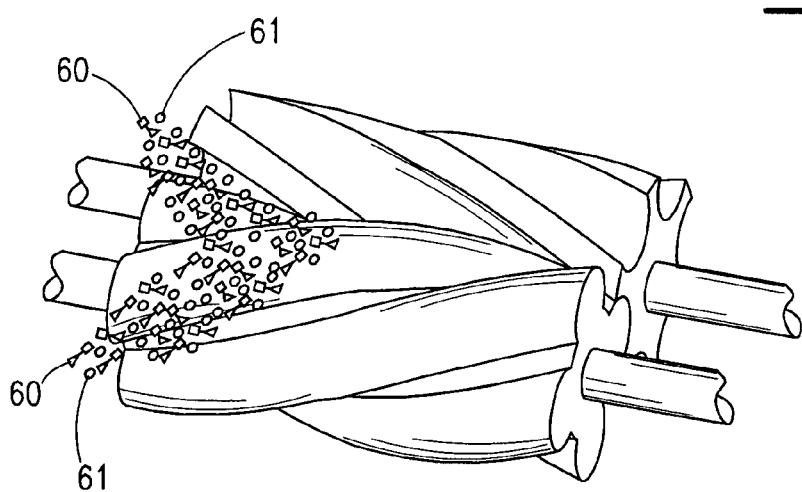
FIG. 6 is a perspective view of twin helical rotors of a rotary screw compressor in the discharge stage of compressing and dehydrating wet natural gas in accordance with the method and system of the present invention.
Figure 7:
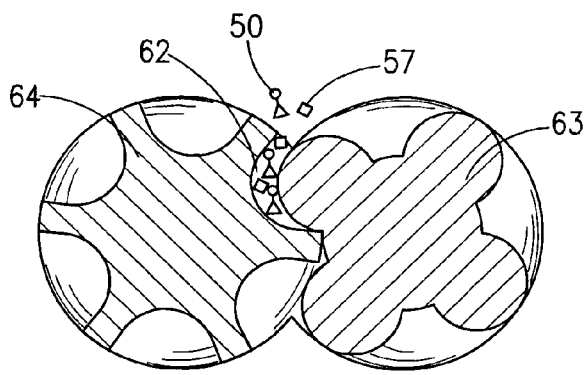
FIG. 7 is cross-sectional view of the meshing of the twin helical rotors of the rotary screw compressor in the pre-discharge stage of compression and dehydration of wet natural gas in accordance with the method and system of the present invention.
Figure 8:
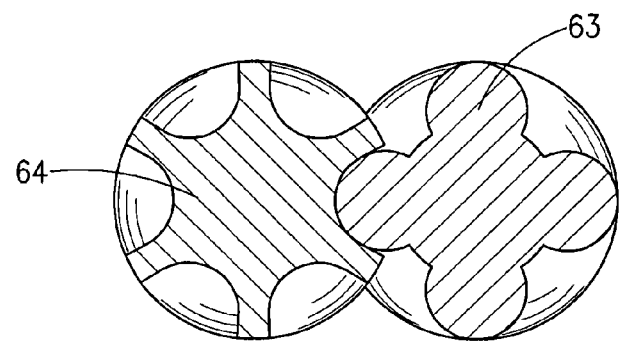
FIG. 8 is cross-sectional view of the meshing of the twin helical rotors of the rotary screw compressor in the initial discharge stage of compression and dehydration of wet natural gas in accordance with the method and system of the present invention.
Figure 9:
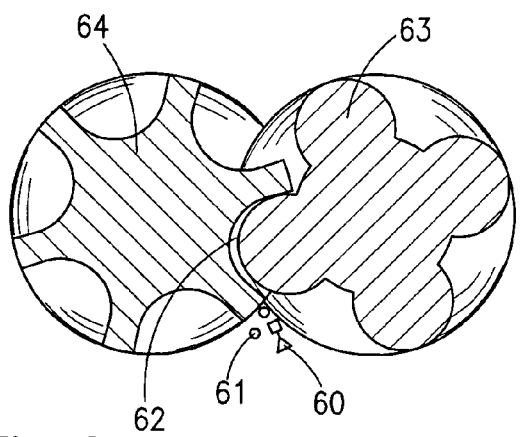
FIG. 9 is cross-sectional view of the meshing of the twin helical rotors of the rotary screw compressor in the interim discharge stage of compression and dehydration of wet natural gas in accordance with the method and system of the present invention.
Figure 10:
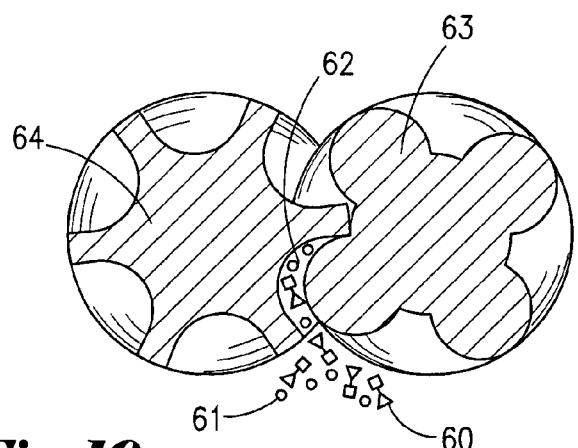
FIG. 10 is cross-sectional view of the meshing of the twin helical rotors of the rotary screw compressor in the latter discharge stage of compression and dehydration of wet natural gas in accordance with the method and system of the present invention.

The process of compression and dehydration is shown in FIGS. 4–10. Wet natural gas 50 and dehydrating agent 57 are present together within flute 62 of female rotor 64 at the initial compression stage. As rotors 63, 64 rotate the volume of flute 62 decreases thus compressing wet natural gas 50 and dehydrating agent 57. As shown in FIGS. 5 and 6, the compression process is capable of causing sufficient intermixing and contacting of wet natural gas 50 and dehydrating agent 57 such that dehydrating agent 57 absorbs water vapor present in wet natural gas 50 to produce dehydrating agent/water mixture 60 in liquid phase. With the removal of water vapor, wet natural gas 50 is dried and becomes compressed dry natural gas 61 in gaseous phase. FIGS. 7–10 show the discharge of compressed dry natural gas 61 and dehydrating agent/water mixture 60 from rotors 63, 64.

Again with reference to FIGS. 3–6, line 65 feeds dehydrating agent/water mixture 60 and compressed dry natural gas 61 from rotary screw compressor 55 to separator 66. Separator 66 separates dehydrating agent/water mixture 60 from compressed dry natural gas 61. Separator 66 may be a conventional oil or glycol separator.

Line 67 feeds compressed dry natural gas 61 from separator 66 to cooler 68. Cooler 68 cools compressed dry natural gas 61 preferably to a temperature of about 100° F. or lower. Cooler 68 may be a conventional air cooler or heat exchanger or a conventional glycol/water fed cooler or heat exchanger. Line 69 feeds cooled compressed dry natural gas 61 from cooler 68 to a gathering system or sales line (not shown).

Line 70 feeds dehydrating agent/water mixture 60 from separator 66 to reboiler 71. Reboiler 71 heats dehydrating agent/water mixture 60 to a temperature that causes vaporization of water from dehydrating agent/water mixture 60 which results in the recovery of dehydrating agent 57. Vaporization of water within reboiler 71 occurs at a temperature range of 275–300° F.

Engine exhaust produced by engine 59 when powering rotary screw compressor 55 is fed via engine exhaust supply line 72 engine 59 to reboiler 71. Reboiler 71 uses the engine exhaust to heat dehydrating agent/water mixture 60 and recover dehydrating agent 57. Reboiler 71 is a standard reboiler which uses exhaust from engine 59 as a heat source. Reboiler 71 may be of a fire tube, U-shaped design having a diameter large enough to permit the unrestricted flow of exhaust produced by engine 59 and still provide enough area for the heating of dehydrating agent/water mixture 60.

The water vaporized in reboiler 71 is vented through vent line 73 to the atmosphere. Line 74 feeds recovered dehydrating agent 57 from reboiler 71 to dehydrating agent pump 75. Preferably, dehydrating agent pump 75 is operatively connected to and powered by engine 59, which powers rotary screw processor 55. Dehydrating agent pump 75 is responsible for pumping dehydrating agent 57 back up to pressure so that dehydrating agent 57 can be fed through the system to rotary screw compressor 55.

Line 76 feeds recovered dehydrating agent 57 from dehydrating agent pump 75 to cooler 68. Cooler 68 cools recovered dehydrating agent 57. Preferably, recovered dehydrating agent 57 is cooled to a temperature of around 80° F.

Line 77 feeds cooled recovered dehydrating agent 57 from cooler 68 to dehydrating agent filter 58. Dehydrating agent filter 58 may be any conventional glycol filter. Two or more dehydrating agent filters 58 may be used to filter cooled recovered dehydrating agent 57. Dehydrating agent filter 58 filters cooled recovered dehydrating agent 57 and thereby removes particulate matter and decreases the particle size of recovered dehydrating agent 57 before it is fed through line 56 back to rotary screw compressor 55 for reuse in system 45. Dehydrating agent 57 may be filtered to a particle size in the range of 5 to 50 microns to remove particulate matter.

While preferred embodiments of the present invention have been described, it is to be understood that the embodiments described are illustrative only and that the scope of the invention is to be defined solely by the appended claims when accorded a full range of equivalence, many variations and modifications naturally occurring to those skilled in the art from a perusal hereof.

What is claimed is:

1. A method of compressing and dehydrating a wet natural gas produced from a low-pressure well, comprising the steps of:
   a) feeding said wet natural gas to a rotary screw compressor;
   b) feeding a dehydrating agent to said rotary screw compressor and permitting said dehydrating agent to associate with said wet natural gas within said rotary screw compressor;
   c) causing said rotary screw compressor to compress and dehydrate said wet natural gas to produce a dehydrating agent/water mixture in a liquid phase and a compressed dry natural gas in a gaseous phase;
   d) feeding said dehydrating agent/water mixture and said compressed dry natural gas from said rotary screw compressor to a separator;
   e) causing said separator to separate said dehydrating agent/water mixture from said compressed dry natural gas;
   f) feeding said compressed dry natural gas from said separator to a cooler;
   g) causing said cooler to cool said compressed dry natural gas;
   h) feeding said cooled compressed dry natural gas from said cooler to a gathering system or sales line;
   i) feeding said dehydrating agent/water mixture from said separator to a reboiler;
   j) causing said reboiler to heat said dehydrating agent/water mixture to a temperature that causes vaporization of said water from said dehydrating agent/water mixture and recovery of said dehydrating agent;
   k) feeding said recovered dehydrating agent from said reboiler to a dehydrating agent pump;
   l) causing said dehydrating agent pump to feed said recovered dehydrating agent from said pump to said cooler;
   m) causing said cooler to cool said recovered dehydrating agent;
   n) feeding said cooled recovered dehydrating agent from said cooler to a dehydrating agent filter;
   o) permitting said dehydrating agent filter to filter said cooled recovered dehydrating agent;
   p) feeding said filtered cooled recovered dehydrating agent from said dehydrating agent filter to said rotary screw compressor for reuse in step (a).

2. The method according to claim 1, wherein said dehydrating agent is a glycol.

3. The method according to claim 2, wherein said glycol is selected from the group consisting of diethylene glycol, triethylene glycol, tetraethlyene glycol, polyethylene glycol, polypropylene glycol, 1,3-butylene glycol, hexylene glycol, and any combination thereof.

4. The method according to claim 1, wherein said rotary screw compressor is operatively connected to and powered by an internal combustion engine.

5. The method according to claim 4, wherein said engine produces an engine exhaust.

6. The method according to claim 5, further comprising the step of feeding said engine exhaust from said engine to said reboiler, said reboiler using said engine exhaust in step (j) to heat said dehydrating agent/water mixture.

7. The method according to claim 1, where said dehydrating agent pump is operatively connected to and powered by said engine.

8. A method of compressing and dehydrating a wet natural gas produced from a low-pressure well, comprising the steps of:
   a) obtaining a hydrocarbon production from a wellhead of said low-pressure well, said hydrocarbon production comprising said wet natural gas and a free liquid contaminant;
   b) feeding said hydrocarbon production to an inlet scrubber;
   c) causing said inlet scrubber to separate said free liquid contaminant in said hydrocarbon production from said wet natural gas in said hydrocarbon production;
   d) feeding said wet natural gas from said inlet scrubber to a rotary screw compressor;
   e) feeding a dehydrating agent to said rotary screw compressor and permitting said dehydrating agent to associate with said wet natural gas within said rotary screw compressor;
   f) causing said rotary screw compressor to compress and dehydrate said wet natural gas to produce a dehydrating agent/water mixture in a liquid phase and a compressed dry natural gas in a gaseous phase;
   g) feeding said dehydrating agent/water mixture and said compressed dry natural gas from said rotary screw compressor to a separator;
   h) causing said separator to separate said dehydrating agent/water mixture from said compressed dry natural gas;
   i) feeding said compressed dry natural gas from said separator to a cooler;
   j) causing said cooler to cool said compressed dry natural gas;
   k) feeding said cooled compressed dry natural gas from said cooler to a gathering system or sales line;
   l) feeding said dehydrating agent/water mixture from said separator to a reboiler;
   m) causing said reboiler to heat said dehydrating agent/water mixture to a temperature that causes vaporization of said water from said dehydrating agent/water mixture and recovery of said dehydrating agent;
   n) feeding said recovered dehydrating agent from said reboiler to a dehydrating agent pump;
   o) causing said dehydrating agent pump to pump said recovered dehydrating agent from said reboiler to said cooler;
   p) causing said cooler to cool said recovered dehydrating agent;
   q) feeding said cooled recovered dehydrating agent from said cooler to a dehydrating agent filter;
   r) permitting said dehydrating agent filter to filter said cooled recovered dehydrating agent; and
   s) feeding said filtered cooled recovered dehydrating agent from said dehydrating agent filter to said rotary screw compressor for reuse in step (a);
   wherein said rotary screw compressor is operatively connected to and powered by an internal combustion engine;
   wherein said engine produces an engine exhaust;
   wherein said engine exhaust is fed to said reboiler, said reboiler using said engine exhaust in step (m) to heat said dehydrating agent/water mixture; and
   wherein said dehydrating agent pump is operatively connected to and powered by said engine.

9. The method according to claim 8, wherein said dehydrating agent is a glycol.

10. The method according to claim 9, wherein said glycol is selected from the group consisting of diethylene glycol, triethylene glycol, tetraethlyene glycol, polyethylene glycol, polypropylene glycol, 1,3-butylene glycol, hexylene glycol, and any combination thereof.

11. A system for compressing and dehydrating a wet natural gas produced from a low-pressure well, comprising:
- a first line feeding a hydrocarbon production obtained from a wellhead of said low-pressure well to an inlet scrubber, said hydrocarbon production comprising said wet natural gas and a free liquid contaminant; said inlet scrubber operating to separate said free liquid contaminant in said hydrocarbon production from said wet natural gas in said hydrocarbon production;
- a second line feeding said wet natural gas from said inlet scrubber to a rotary screw compressor;
- a third line feeding a dehydrating agent from a dehydrating agent filter to said rotary screw compressor, said dehydrating agent associating with said wet natural gas within said rotary screw compressor;
- an internal combustion engine operatively connected to said rotary screw compressor, said rotary screw compressor being powered by said engine to compress and dehydrate said wet natural gas to produce a dehydrating agent/water mixture in a liquid phase and a compressed dry natural gas in a gaseous phase;
- a fourth line feeding said dehydrating agent/water mixture and said compressed dry natural gas from said rotary screw compressor to a separator, said separator separating said dehydrating agent/water mixture from said compressed dry natural gas;
- a fifth line feeding said compressed dry natural gas from said separator to a cooler, said cooler cooling said compressed dry natural gas;
- a sixth line feeding said cooled compressed dry natural gas from said cooler to a gathering system or sales line;
- a seventh line feeding said dehydrating agent/water mixture from said separator to a reboiler, said reboiler heating said dehydrating agent/water mixture to a temperature that causes vaporization of said water from said dehydrating agent/water mixture and recovery of said dehydrating agent;
- an eighth line feeding said recovered dehydrating agent from said reboiler to a dehydrating agent pump;
- a ninth line feeding said recovered dehydrating agent from said dehydrating agent pump to said cooler, said cooler cooling said recovered dehydrating agent;
- a tenth line feeding said cooled recovered dehydrating agent from said cooler to said dehydrating agent filter, said dehydrating agent filter filtering said cooled recovered dehydrating agent before said cooled recovered dehydrating agent is fed through said third line to said rotary screw compressor for reuse in said system.

12. The system according to claim 11, wherein said engine produces an engine exhaust.

13. The system according to claim 12, further comprising an engine exhaust supply line feeding said engine exhaust from said engine to said reboiler, said reboiler using said engine exhaust to heat said dehydrating agent/water mixture.

14. The system according to claim 11, wherein said dehydrating agent pump is operatively connected to and powered by said engine.

15. The system according to claim 14, wherein said dehydrating agent pump causes said recovered dehydrating agent to be fed to said rotary screw compressor.

16. The system according to claim 11, wherein said dehydrating agent is a glycol.

17. The system according to claim 16, wherein said glycol is selected from the group consisting of diethylene glycol, triethylene glycol, tetraethlyene glycol, polyethylene glycol, polypropylene glycol, 1,3-butylene glycol, hexylene glycol, and any combination thereof.

* * * * *